United States Patent
Schneider (10) Patent No.: US 9,558,097 B2
(45) Date of Patent: Jan. 31, 2017

(54) AUTOMATED RECORDING AND PLAYBACK OF APPLICATION INTERACTIONS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1632 days.

(21) Appl. No.: 11/985,122

(22) Filed: Nov. 13, 2007

(65) Prior Publication Data

US 2009/0125581 A1  May 14, 2009

(51) Int. Cl.
*G06F 9/45* (2006.01)
*G06F 11/34* (2006.01)

(52) U.S. Cl.
CPC ........ *G06F 11/3414* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 5,410,681 A | 4/1995 | Jessen et al. | |
| 5,737,517 A | 4/1998 | Kite et al. | |
| 5,838,919 A | 11/1998 | Schwaller et al. | |
| 6,189,031 B1 | 2/2001 | Badger et al. | |
| 6,219,803 B1 | 4/2001 | Casella et al. | |
| 6,397,359 B1 | 5/2002 | Chandra et al. | |
| 6,920,502 B2 | 7/2005 | Araujo | |
| 6,963,996 B2 | 11/2005 | Coughlin | |
| 6,981,041 B2 | 12/2005 | Araujo | |
| 7,006,963 B1 | 2/2006 | Maurer | |
| 7,043,546 B2 | 5/2006 | Smith et al. | |
| 7,065,549 B2 | 6/2006 | Sun et al. | |
| 7,072,951 B2 * | 7/2006 | von Klopp et al. | 709/219 |
| 7,111,060 B2 | 9/2006 | Araujo | |
| 7,269,633 B2 | 9/2007 | Allan | |
| 7,349,867 B2 | 3/2008 | Rollins et al. | |
| 7,392,321 B1 * | 6/2008 | Wolf et al. | 709/232 |
| 7,415,429 B2 | 8/2008 | Rollins et al. | |
| 7,451,177 B1 * | 11/2008 | Johnson et al. | 709/203 |
| 7,481,361 B2 | 1/2009 | Dickerson et al. | |
| 7,519,702 B1 | 4/2009 | Allan | |
| 7,895,446 B2 * | 2/2011 | Harada et al. | 713/185 |
| 8,069,407 B1 | 11/2011 | Armandpour et al. | |
| 2002/0032798 A1 | 3/2002 | Xu | |
| 2002/0042839 A1 | 4/2002 | Peiffer et al. | |

(Continued)

OTHER PUBLICATIONS

Tsai, W. T., et al., "Verification of Web Services Using an Enhanced UDDI Server," Proceedings of the 8th IEEE Int'l. Workshop on Object-Oriented Real-Time Dependable Systems, pp. 131-138, Jan. 2003 (8 pgs.).

(Continued)

*Primary Examiner* — Isaac T Tecklu
(74) *Attorney, Agent, or Firm* — Lowenstein Sandler LLP (57) ABSTRACT

Some embodiments of automated recording and playback of application interactions have been presented. In one embodiment, an application proxy server communicatively coupled between an application server and a client records responses and requests between an application server and a client during a transaction. Furthermore, the application proxy server generates a script based on the responses and requests recorded.

17 Claims, 5 Drawing Sheets

(56) References Cited

U.S. PATENT DOCUMENTS

| | | | |
|---|---|---|---|
| 2002/0143931 A1* | 10/2002 | Smith et al. | 709/224 |
| 2002/0188661 A1* | 12/2002 | Casais | 709/202 |
| 2003/0041124 A1 | 2/2003 | Navarre et al. | |
| 2003/0055883 A1* | 3/2003 | Wiles, Jr. | 709/203 |
| 2003/0163608 A1* | 8/2003 | Tiwary et al. | 710/1 |
| 2003/0164850 A1* | 9/2003 | Rojewski et al. | 345/733 |
| 2003/0197719 A1* | 10/2003 | Lincke et al. | 345/710 |
| 2003/0236883 A1 | 12/2003 | Takeshima et al. | |
| 2004/0001077 A1* | 1/2004 | Patterson | 345/700 |
| 2004/0059809 A1 | 3/2004 | Benedikt et al. | |
| 2004/0111488 A1* | 6/2004 | Allan | 709/217 |
| 2004/0143931 A1 | 7/2004 | Dennis | |
| 2004/0172253 A1* | 9/2004 | Singh | 704/270.1 |
| 2004/0225999 A1 | 11/2004 | Nuss | |
| 2004/0267820 A1* | 12/2004 | Boss et al. | 707/104.1 |
| 2006/0005079 A1 | 1/2006 | Kaplan et al. | |
| 2006/0085537 A1 | 4/2006 | Dickerson et al. | |
| 2007/0022406 A1* | 1/2007 | Liu | 717/124 |
| 2007/0050844 A1 | 3/2007 | Lebel | |
| 2007/0069005 A1 | 3/2007 | Dickerson et al. | |
| 2007/0124453 A1 | 5/2007 | Slaughter et al. | |
| 2007/0248105 A1 | 10/2007 | Shinoda et al. | |
| 2008/0052548 A1 | 2/2008 | Olsen et al. | |
| 2008/0065702 A1 | 3/2008 | Dickerson et al. | |
| 2008/0080531 A1* | 4/2008 | Williams et al. | 370/401 |
| 2008/0133210 A1 | 6/2008 | Chagoly et al. | |
| 2008/0177824 A1* | 7/2008 | Wang et al. | 709/203 |
| 2009/0089404 A1* | 4/2009 | Guo | 709/219 |
| 2009/0095807 A1 | 4/2009 | Dickerson et al. | |
| 2010/0251217 A1* | 9/2010 | Miller | 717/126 |
| 2010/0281457 A1* | 11/2010 | Ren | 717/105 |

OTHER PUBLICATIONS

Office Action for U.S. Appl. No. 11/985,670, mailed Oct. 2, 2009, (14 pgs.).

Final Office Action for U.S. Appl. No. 11/804,702, mailed Jun. 11, 2009, (5 pgs.).

Final Office Action for U.S. Appl. No. 11/804,702, mailed Nov. 17, 2009, (6 pgs.).

Final Office Action for U.S. Appl. No. 11/804,702, mailed Feb. 25, 2010, (8 pgs.).

Final Office Action for U.S. Appl. No. 11/985,670, mailed Mar. 29, 2010, (15 pgs.).

Advisory Action for U.S. Appl. No. 11/985,670, mailed May 26, 2010 (3 pgs.).

Final Office Action for U.S. Appl. No. 11/804,702, mailed Jun. 15, 2010, (6 pgs.).

Simple Network Management Protocol from Wikipedia http://en.wikipedia.org/wiki/SMNP. Oct. 31, 2007. 12 pages.

Redhat Command Center. Redhat.com. http://www.redhat.com/command_center. Sep. 18, 2007. 4 pages.

Hypertext Transfer Protocol—HTTP/1.1, The Secure Hypertext Transfer Protocol. Jun. 1999, 114 pages.

HMAC: Keyed-Hashing for Message Athentication. Feb. 1997. 11 pages.

HTTP Over TLS. May 2000. 7 pages.

The Transport Layer Security (TLS) Protocol Version 1.1, Apr. 2006. 82 pages.

HTTP Authentication: Basic and Digest Access Authentication. Jun. 1999. 32 pages.

Hypertext Transfer Protocol (HTTP) Digest Authentication Using Authentication and Key Agreement (AKA) Version-2. Nov. 2005. 13 pages.

http://jakarta.apache.org/jmeter/. Feb. 23, 2007. 2 pages.

http://www.aepnetworks.com/ AEP Netilla Security Platform (NSP). 2007. 2 pages.

http://httpd.apache.org/docs/2.0/. Apr. 24, 2007. 192 pages.

The Advanced Encryption Standard-Cipher-based Message Authentication Code-Pseudo-Random Function-128. Aug. 2006. 7 pages.

Notice of Allowance and Fees Due mailed Feb. 23, 2011 for U.S. Appl. No. 11/804,702, filed May 18, 2007, 5 pages.

Office Action mailed Oct. 6, 2010 for U.S. Appl. No. 11/804,702, filed May 18, 2007, 6 pages.

Advisory Action mailed Aug. 16, 2010 for U.S. Appl. No. 11/804,702, filed May 18, 2007, 2 pages.

Advisory Action for U.S. Appl. No. 11/985,670, mailed May 28, 2010.

Advisory Action for U.S. Appl. No. 11/804,702, mailed May 10, 2010.

USPTO, Office Action for U.S. Appl. No. 11/985,670, mailed Oct. 2, 2009.

USPTO, Final Office Action for U.S. Appl. No. 11/985,670, mailed Mar. 29, 2010.

USPTO, Notice of Allowance for U.S. Appl. No. 11/985,670, mailed Mar. 29, 2012.

USPTO, Office Action for U.S. Appl. No. 11/985,122, mailed Jan. 11, 2012.

USPTO, Final Office Action for U.S. Appl. No. 11/985,122, mailed Apr. 27, 2012.

USPTO, Office Action for U.S. Appl. No. 11/985,122, mailed Aug. 27, 2013.

USPTO, Final Office Action for U.S. Appl. No. 11/985,122, mailed Feb. 20, 2014.

USPTO, Advisory Action for U.S. Appl. No. 11/985,122, mailed Jun. 26, 2012.

USPTO, Advisory Action for U.S. Appl. No. 11/985,122, mailed Apr. 17, 2014.

USPTO, Notice of Allowance for U.S. Appl. No. 11/985,122, mailed Jun. 4, 2014.

* cited by examiner

AUTOMATED RECORDING AND PLAYBACK OF APPLICATION INTERACTIONS

TECHNICAL FIELD

Embodiments of the present invention relate to application interactions, and more specifically to recording and playback of application interactions using an application proxy.

BACKGROUND

As the use of computers become more popular and common in the everyday life of people, many applications are developed for various different usages. An application as used herein generally refers to a program or a suite of programs executable by one or more processors to perform one or more tasks and/or functions. Currently, many applications are developed to conduct transactions between multiple machines (e.g., servers and clients). These transactions may or may not be carried over a network. Moreover, these applications may or may not interact with other applications (e.g., requesting information from another application, providing data to another application, updating records using another application, etc.).

An important part of the development of applications is quality assurance, which involves testing of applications. For applications that interact with other applications and/or users, tests are needed to test the way the applications interact with each other. Currently, software developers routinely test such applications by manually interacting with these applications to emulate interaction with other applications and/or users in a variety of scenarios.

The above approach to test applications suffers from many disadvantages. First, the above approach is labor intensive because it requires a quality assurance engineer to manually create a series of predetermined user interactions and/or application interactions with the application under test. Further, additional effort is needed to analyze the test result. When the test has to be re-executed in order to test another revision of the application, the quality assurance engineer has to manually repeat the above procedures.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of automated recording and playback of application interactions. In one embodiment, an application proxy server communicatively coupled between an application server and a client records responses and requests between the application server and the client during a transaction. Furthermore, the application proxy server generates a script based on the responses and requests recorded. The script may be executed to replay the transaction. A transaction as used herein broadly refers to a series of exchanges between an application and another entity, which may include one or more of a user, another application, a client machine, etc. One example of a transaction is a session that begins with a user logging into an online banking application and ends with the user logging out of the online banking application. In this example, the other entity includes the user and a client machine on which a user interface of the online banking application is displayed. Data (e.g., account number, passwords, etc.) and instructions (e.g., requests to transfer funds from one account to another account, requests to view details of an account, etc.) may be exchanged between the user and the online banking application during the transaction. More details of some embodiments of the automated recording and playback of application interactions are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 1:
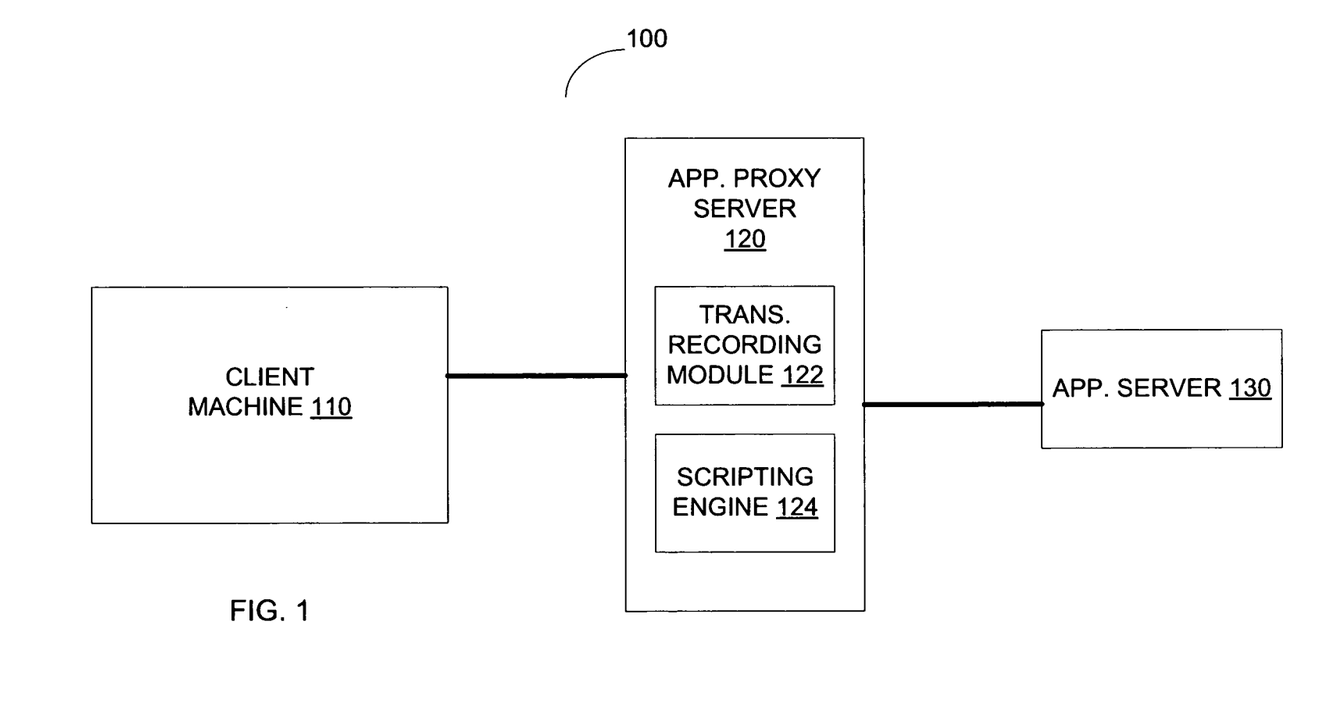
FIG. 1 illustrates one embodiment of a system in which embodiments of the present invention may be implemented.

FIG. 1 illustrates one embodiment of a system in which embodiments of the present invention may be implemented. The system 100 includes a client machine 110, an application proxy server 120, and an application server 130. The client machine 110 is coupled to the application proxy server 120, which is further coupled to the application server 130. The client machine 110 may include a computing machine, such as a desktop personal computer (PC), a laptop PC, a personal digital assistant (PDA), a mobile telephone, etc. In some embodiments, a network access application (e.g., a browser, an electronic mail engine, etc.) is executable on the client machine 110. The application proxy server 120 may be implemented using a computing machine, such as the one illustrated in FIG. 4. The application proxy server 120 is further coupled to the application server 130. The application server 130 may communicate with the client machine 110 via the application proxy server 120, which serves as an intermediary between the client machine 110 and the application server 130. The application server 130 may be implemented using a computing machine, such as the one illustrated in FIG. 4, that is operable to execute an application. An application as used herein broadly refers to a program or a suite of program having instructions executable by a computing machine to perform one or more tasks. The client machine 110, the proxy server 120, and the application server 130 may be coupled to each other via one or more networks, such as a local area network (LAN), an intranet, the Internet, etc.

Note that any or all of the components of the system 100 and associated hardware may be used in various embodiments of the present invention. However, it can be appreciated that other configurations of the system 100 may include more or fewer devices than those discussed above In some embodiments, a user of the client machine 110 accesses an application provided by the application server 130. The series of exchanges between the user and the application is referred to as a transaction herein. It is generally useful to record information on the transaction so that the transaction may be played back for various purposes (e.g., debugging, quality assurance, etc.). The information may include requests and responses (including data) transmitted between the client machine 110 and the application server 130 via the application proxy server 120. The information on the transaction may be recorded in response to a request from the user. Alternatively, a system administrator of the system 100 may initiate a request to record the information, subject to approval or consent by the user. In response to the request, a transaction recording module 122 within the application proxy server 120 records the information of the transaction.

In some embodiments, a scripting engine 124 in the application proxy server 120 may automatically generate a script based on the information of the transaction recorded. The application proxy server 120 may execute the script later to replay the transaction recorded without requiring the user to participate in the replay. Playing back the transaction generally refers to repeating the transaction in substantially the same manner as the transaction has been carried out earlier. Such a script is useful for various purposes, such as debugging the application, testing a new release or version of the application, etc. By automating the script generation process, both time and labor may be saved in quality assurance. Furthermore, the script provides real-life test cases for testing the application, which may be more effective in uncovering potential problems with the application than hypothetical test cases.

Note that the recording of the transaction described above may be done over secured connections and/or non-secured connections between the client machine 110, the application proxy server 120, and the application server 130. One example of a secured connection is a secure hypertext transfer protocol (HTTPS) connection. In some embodiments, where sensitive and/or private data is entered during the transaction (e.g., passwords to log into a bank account, personal information, such as credit card numbers, social security number, etc.), the above transaction recording may be performed over secured connections to protect the data.

In an alternate embodiment, the application proxy server 120 and the application server 130 may be merged together. In other words, a single server may execute the application as well as an application proxy to act as an intermediary between the application and the client machine 110. The application proxy may carry out tasks in substantially the same way as the application proxy server 120 as described above.

Figure 2:
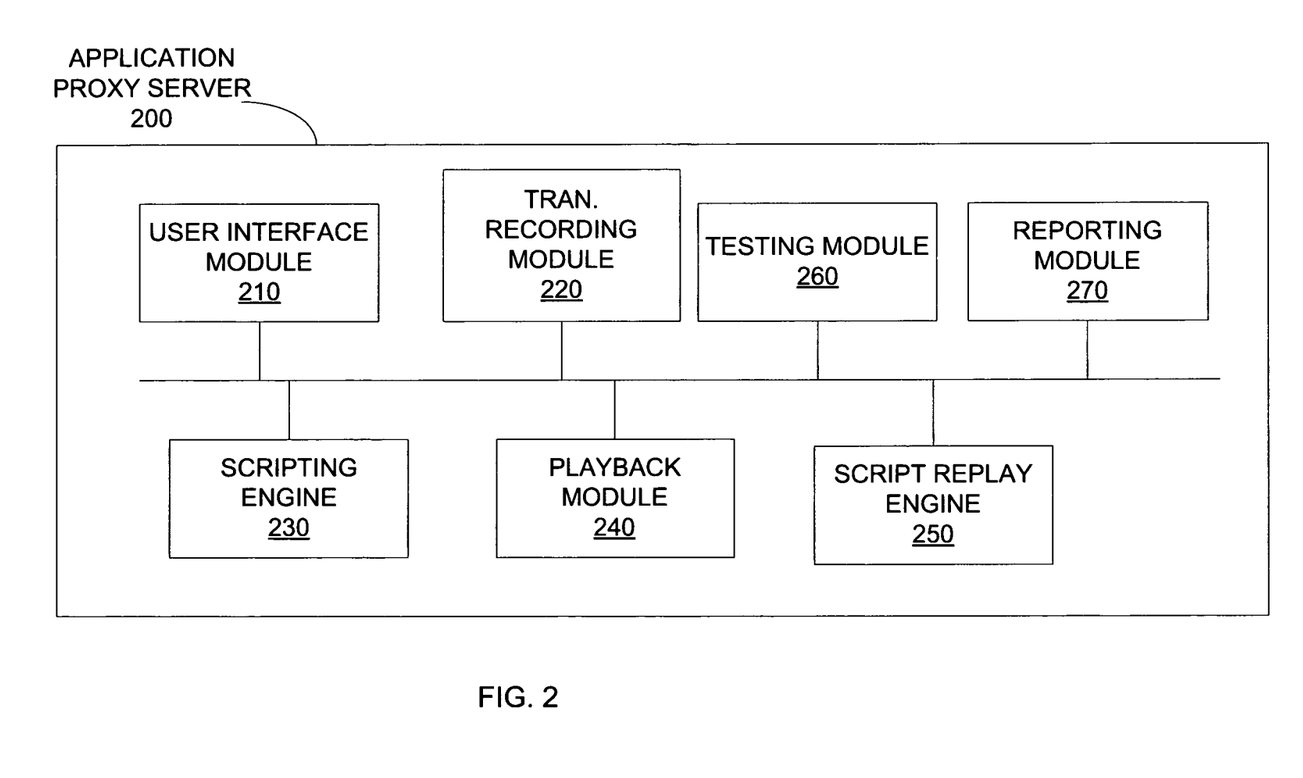
FIG. 2 illustrates a functional block diagram of one embodiment of an application proxy server.

FIG. 2 illustrates a functional block diagram of one embodiment of an application proxy server. The application proxy server 200 may be implemented on a computing device, such as the one described below with reference to FIG. 4. The application proxy server 200 includes a user interface 210, a transaction recording module 220, a scripting engine 230, a playback module 240, and a script replay engine 250, a testing module 260, and a reporting module 270, which are operatively coupled to each other.

In some embodiments, the transaction recording module 220 records information of a transaction between an application server and a client communicatively coupled to the application proxy server during a transaction. The transaction information may include data (e.g., data input by the user at the client), responses, and requests transmitted between the client and the application server via the application proxy server during the transaction. Based on the information recorded, the scripting engine 230 generates a script for replaying the transaction. In some embodiments, the scripting engine 230 generates the script in a general-purpose scripting language, such as Programmable Command Language (PCL). Alternatively, the scripting engine 230 may generate the script in a special-purpose scripting language.

In some embodiments, the user interface module 210 generates a user interface (e.g., a graphical user interface, a text editor, etc.) to allow users (e.g., system administrator) to modify the script generated. As such, the script may be modified to meet different needs in testing the application.

In some embodiments, the testing module 260 tests the application server by causing the script replay engine 250 to execute the script to play back the transaction between the client and the application server. The playback module 240 may identify differences between the earlier recorded transaction and the playback of the transaction, such as, for example, which parts of the responses by the application are different during the playback of the transaction. Identification of these differences is important in testing a new release or version of the application. Furthermore, since the transaction playback is done using the script, which may be played back multiple times readily, the above techniques provide an easy and consistent way to test the application prior to release of new versions of the application. In some embodiments, the playback module 240 may further determine what the differences are between the recorded transaction and the playback.

In some embodiments, the reporting module 270 generates a report on results of the testing. The report may include details on the differences between the recorded transaction and the playback, if any. The reporting module 270 may send the report to users electronically and/or store a copy of the report on the application proxy server 200 for users to access later.

Figure 3A:
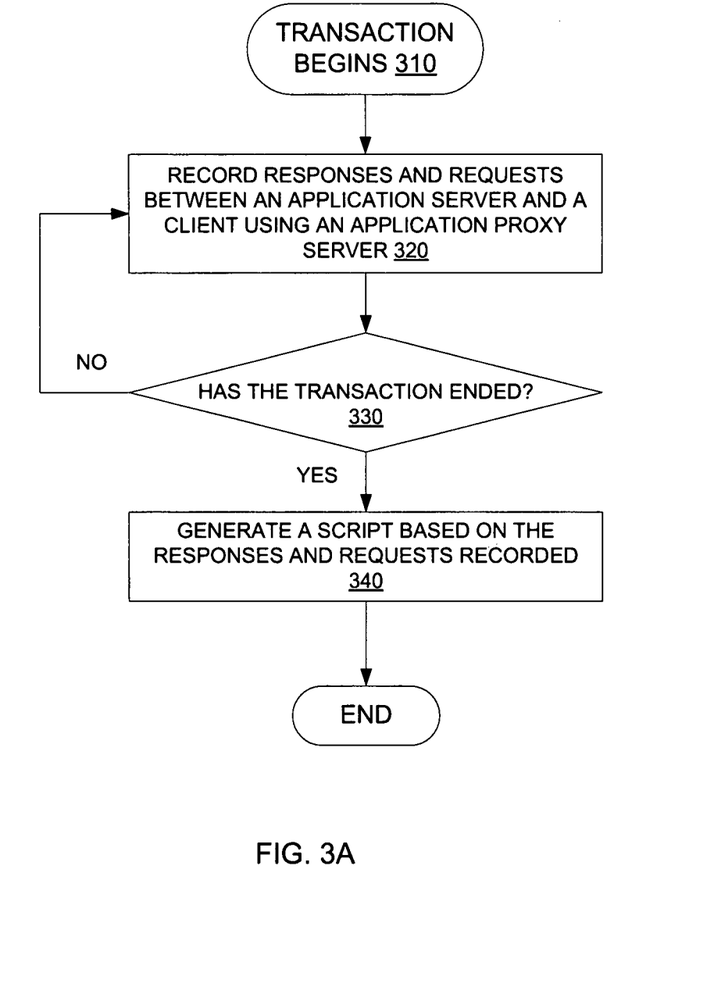
FIG. 3A illustrates a flow diagram of one embodiment of a process to script requests and responses in a transaction.

FIG. 3A illustrates a flow diagram of one embodiment of a process to script requests and responses in a transaction between a client and an application server using an application proxy server. The process may be performed by processing logic that may comprise hardware (e.g., circuitry, dedicated logic, programmable logic, microcode, etc.), software (such as instructions run on a processing device), firmware, or a combination thereof. For example, the application proxy server 200 in FIG. 2 may perform at least part of the process in some embodiments.

In some embodiments, the process begins as the transaction to be recorded begins at processing block 310. Processing logic records requests and responses between the client and the application server during the transaction (processing block 320). Processing logic checks if the transaction has ended (processing block 330). If not, processing logic returns to processing block 320 to continue recording. Otherwise, processing logic transitions to processing block 340. At processing block 340, processing logic generates a script based on the requests and responses recorded. Then the process ends.

Figure 3B:
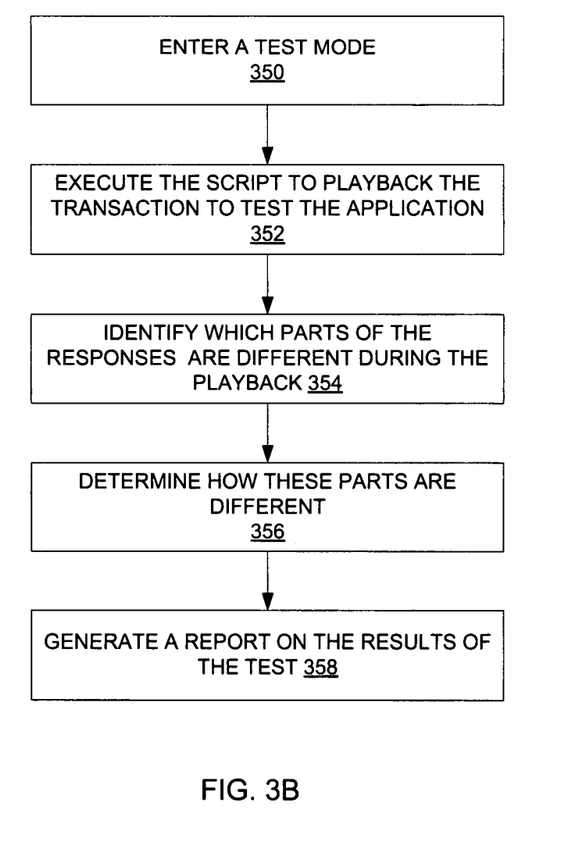
FIG. 3B illustrates a flow diagram of one embodiment of a process to test an application.

FIG. 3B illustrates a flow diagram of one embodiment of a process to test the application using the script generated according to FIG. 3A. The process may be performed by processing logic that may comprise hardware (e.g., circuitry, dedicated logic, programmable logic, microcode, etc.), software (such as instructions run on a processing device), firmware, or a combination thereof. For example, the application proxy server 200 in FIG. 2 may perform at least part of the process in some embodiments.

In some embodiments, processing logic enters a test mode (processing block 350). For example, processing logic may set a test flag and/or a test bit to enter the test mode. Then processing logic executes the script previously generated to playback the transaction to test the application (e.g., a new version of the application) (processing block 352). After replaying the transaction, processing logic may examine the replay of the transaction to determine which part of the replay is different from the previously recorded transaction (processing block 354). For example, the timestamps in the replay and the recorded transaction may be different, which may indicate a differences between the response time in the replay and the response time in the recorded transaction.

In some embodiments, processing logic further determines how these parts are different (processing block 356). Referring back to the above example, processing logic may compute the difference in response time using the timestamps in the replay and the recorded transaction. If the difference in the response time exceeds a predetermined limit, then there is likely to be a problem with the responding server. Thus, processing logic may raise a red flag to alert software developers running the test. Processing logic may further examine other information, such as tracking cookies, log files, etc., to account for the differences between the replay and the recorded transaction.

In some embodiments, processing logic generates a report on the results of the test (processing block 358). The report may include information, such as details of the replay, the differences between the replay and the recorded transaction, etc. Processing logic may store the report for users to access later. Alternatively, processing logic may electronically deliver the report (e.g., via electronic mail) to users.

Figure 4:
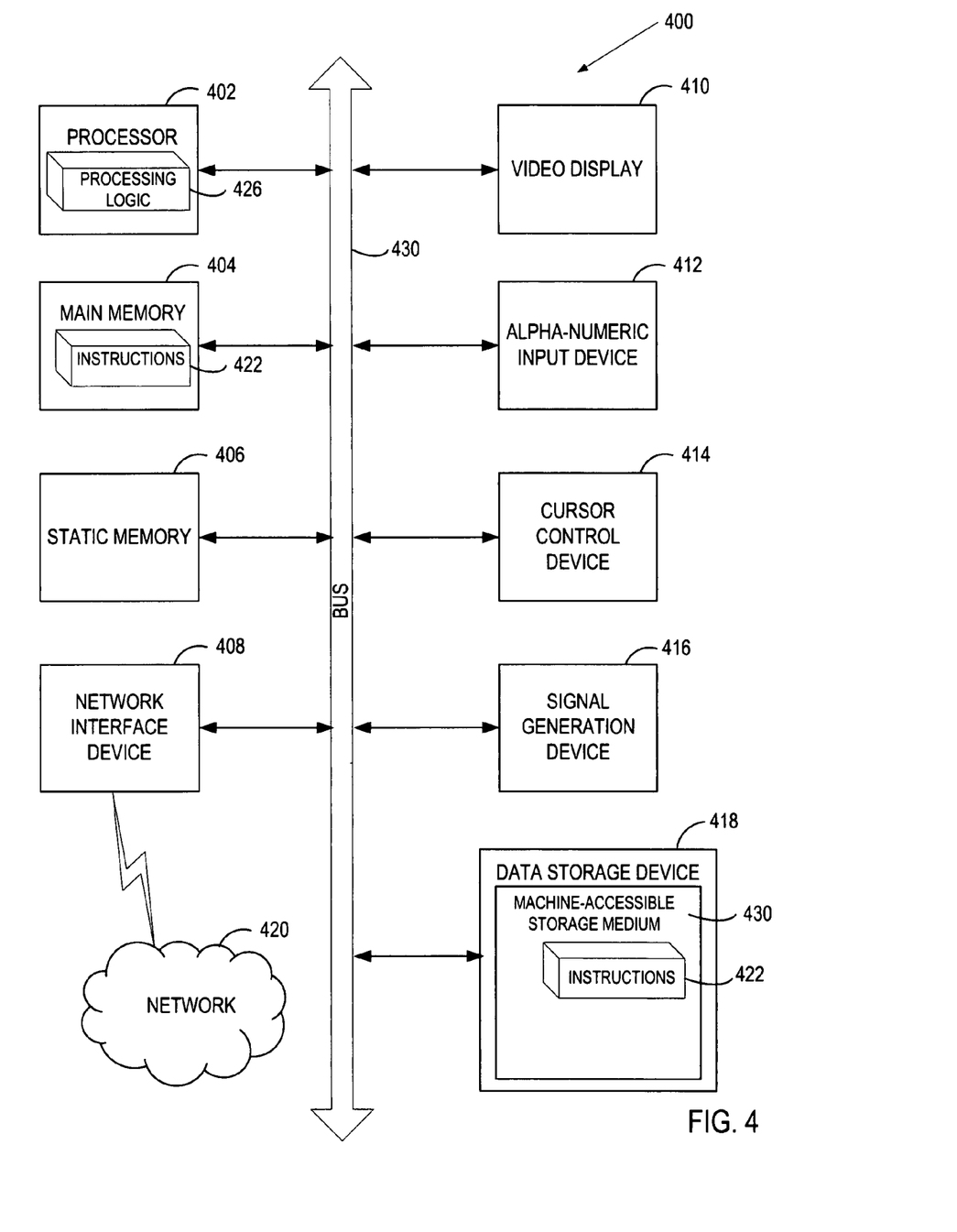
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of automated recording and playback of application interactions have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    establishing, by a processing device of an application proxy server, a secure communication connection between the application proxy server and a client machine, wherein the application proxy server is physically separate from and communicatively coupled between an application server and the client machine;
    recording, by the processing device at the application proxy server, responses and requests of a transaction of a first version of an application, the responses and requests communicated between the application server and the client machine and passing through the application proxy server via the secure communication connection;
    generating, by the processing device in view of the recorded responses and requests, a script for replaying the transaction;
    executing, by the processing device at the application proxy server, the generated script to replay the transaction to test a second version of the application, wherein the second version of the application is different than the first version of the application, and wherein the transaction is replayed between the application proxy server and the application server without interaction from the client machine;
    identifying one or more portions of the replayed transaction that are different from the recorded transaction in view of different response times between the recorded requests and responses in the respective recorded transaction and the replayed transaction;
    determining, for each of the one or more identified portions, differences in response time between the recorded requests and responses between the recorded transaction and the replayed transaction; and
    responsive to at least one of the determined differences in response time exceeded a threshold time limit, generating an alert that indicates a possible problem with at least one of the second version of the application or the application server.

2. The method of claim 1, further comprising:
    creating a user interface to allow users to modify the script generated.

3. The method of claim 1, further comprising:
    determining differences between responses that occur during a playback of the transaction and the responses recorded; and
    examining tracking cookies to account for the differences.

4. The method of claim 1, further comprising:
    testing the application server by executing the script to play back the transaction; and
    generating a report on results of the testing.

5. An application proxy server, comprising:
    a storage device to store instructions; and
    a processing device coupled to the storage device, to retrieve the instructions from the storage device and, in response to the instructions, to execute:
        establish a secure communication connection between the application proxy server and a client machine, wherein the application proxy server is physically separate from and communicatively coupled between an application server and the client machine;
        record responses and requests of a transaction of a first version of an application, the responses and requests communicated between the application server and the client machine and passing through the application proxy server via the secure communication connection;
        generate, in view of the recorded responses and requests, a script for replaying the transaction;
        execute the generated script to replay the transaction to test a second version of the application, wherein the second version of the application is different than the first version of the application, and wherein the transaction is replayed between the application proxy server and the application server without interaction from the client machine;
        identify one or more portions of the replayed transaction that are different from the recorded transaction in view of different response times between the recorded requests and responses in the respective recorded transaction and the replayed transaction;
        determine, for each of the one or more identified portions, differences in response time between the recorded requests and responses between the recorded transaction and the replayed transaction; and
        responsive to at least one of the determined differences in response time exceeded a threshold time limit, generate an alert that indicates a possible problem with at least one of the second version of the application or the application server.

6. The application proxy server of claim 5, wherein the transaction information comprises data input by a user at the client.

7. The application proxy server of claim 5, wherein the processing device is further to execute:
    a user interface module to create a user interface to allow users to modify the script generated.

8. The application proxy server of claim 5, wherein the processing device is further to execute:
   a playback module coupled to the script replay engine, to determine differences between responses that occur during a playback of the transaction and the responses recorded, and to examine tracking cookies to account for the differences.

9. The application proxy server of claim 5, wherein the processing device is further to execute:
   a testing module coupled to the script replay engine, to test the application server by causing the script replay engine to execute the script to play back the transaction; and
   a reporting module coupled to the testing module, to generate a report on results of the testing.

10. A system comprising the application proxy server of claim 5, further comprising the application server.

11. A non-transitory machine-readable medium that provides instructions that, if executed by a processing device, cause the processing device:
   establish, by the processing device of an application proxy server, a secure communication connection between the application proxy server and a client machine, wherein the application proxy server is physically separate from and communicatively coupled between an application server and the client machine;
   record responses and requests of a transaction of a first version of an application, the responses and requests communicated between the application server and the client machine using the application proxy server and passing through the application proxy server via the secure communication connection;
   generate, by the processing device in view of the recorded responses and requests, a script for replaying the transaction;
   execute, by the processing device at the application proxy server, the generated script to replay the transaction to test a second version of the application, wherein the second version of the application is different than the first version of the application, and wherein the transaction is replayed between the application proxy server and the application server without interaction from the client machine;
   identify one or more portions of the replayed transaction that are different from the recorded transaction in view of different response times between the recorded requests and responses in the respective recorded transaction and the replayed transaction;
   determine, for each of the one or more identified portions, differences in response time between the recorded requests and responses between the recorded transaction and the replayed transaction; and
   responsive to at least one of the determined differences in response time exceeded a threshold time limit, generate an alert that indicates a possible problem with at least one of the second version of the application or the application server.

12. The non-transitory machine-readable medium of claim 11, wherein the processing device is further to create a graphical user interface to allow users to modify the script generated.

13. The non-transitory machine-readable medium of claim 11, further comprising:
   determining differences between responses that occur during a playback of the transaction and the responses recorded; and
   examining tracking cookies to account for the differences.

14. The non-transitory machine-readable medium of claim 11, wherein the processing device is further to test the application server by executing the script to play back the transaction; and generating a report on results of the testing.

15. A method comprising:
   establishing, by a processing device of an application proxy server, a secure communication connection between the application proxy server and a client machine, wherein the application proxy server is physically separate from and communicatively coupled between an application server and the client machine;
   recording, by the processing device at the application proxy server, responses and requests of a transaction of a first version of an application, the responses and requests communicated between the application server and the client machine and passing through the application proxy server via the secure communication connection;
   generating, by the processing device in view of the recorded responses and requests, a script for replaying the transaction;
   executing, by the processing device at the application proxy server, the generated script to replay the transaction to test a second version of the application, wherein the second version of the application is different than the first version of the application, and wherein the transaction is replayed between the application proxy server and the application server without interaction from the client machine;
   identifying one or more portions of the replayed transaction that are different from the recorded transaction in view of different response times between the recorded requests and responses in the respective recorded transaction and the replayed transaction and by examining other information comprising tracking cookies and log files;
   determining, for each of the one or more identified portions, differences in response time between the recorded requests and responses between the recorded transaction and the replayed transaction; and
   responsive to at least one of the determined differences in response time, information in the tracking cookies, or information in the log files exceeded a threshold time limit, generating an alert that indicates a possible problem with at least one of the second version of the application or the application server.

16. The method of claim 15, further comprising creating a user interface to allow users to modify the script generated.

17. The method of claim 15, further comprising testing the application server by:
   executing the script to play back the transaction; and
   generating a report on results of the testing.

* * * * *